Aug. 30, 1955 J. J. BOOTH 2,716,508
PORTABLE BEVERAGE DISPENSER
Filed Dec. 11, 1950
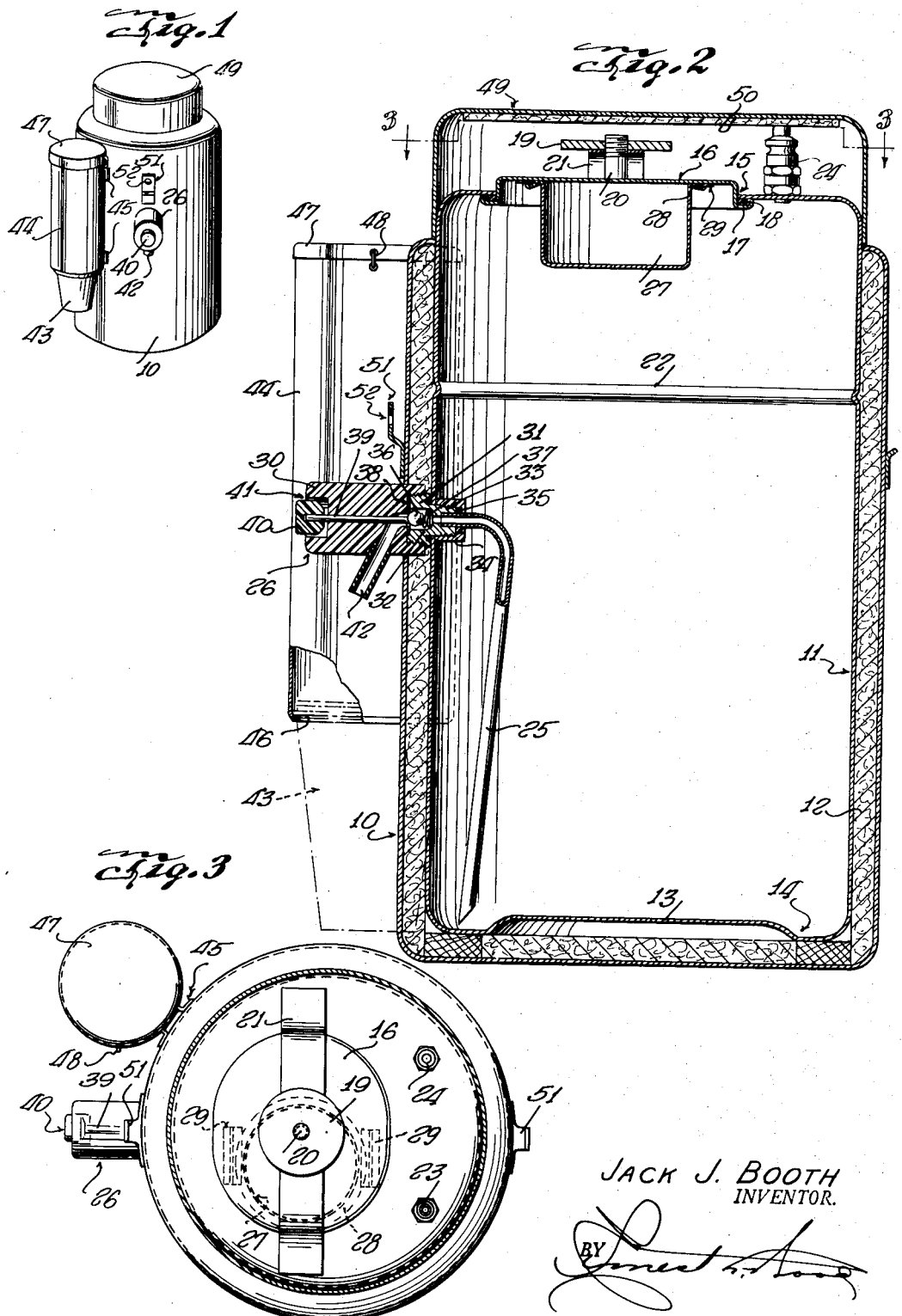
JACK J. BOOTH
INVENTOR.
BY
ATTORNEY

United States Patent Office 2,716,508
Patented Aug. 30, 1955

2,716,508

PORTABLE BEVERAGE DISPENSER

Jack J. Booth, Dallas, Tex.

Application December 11, 1950, Serial No. 200,194

1 Claim. (Cl. 222—131)

This invention relates to beverage dispensing apparatus and more particularly to a portable unit for dispensing carbonated beverage into expendable cups.

The principal object of the invention is to provide an insulated vessel having a predetermined fluid level indicator to which fluid is poured into the vessel through an opening having a sealable closure, the vessel afterwards being charged with carbon dioxide gas through a check valve, adjacent which is a pop-off valve to release gas above a predetermined pressure. The invention further aims to provide a beverage dispensing valve made up of a material of low heat conductivity and to which the beverage, suitably carbonated by admixture of $CO_2$ gas, is elevated by pressure of said gas to be released into a cup withdrawn from a column of cups enclosed in a dispensing magazine attached to the beverage dispensing vessel.

Briefly, the invention seeks to provide a convenient medium for serving patrons, for example, of game stadiums, resorts and the like with pre-cooled carbonated beverages in a sanitary manner for a dispenser equipped with suitable harness by which the attendant may conveniently carry it and at the same time manipulate the cups and dispensing valve.

Other objects will appear as the description proceeds, taken in connection with the accompanying drawing wherein:

Figure 1 is a perspective view of a portable beverage dispenser constructed according to the invention.

Figure 2 is a view in vertical section on a considerably larger scale, and

Figure 3 is a sectional view taken on line 3—3 of Figure 2.

Continuing with a more detailed description of the drawing, reference numeral 10 denotes the outer casing of a vessel 11 and between the vessel and casing is a jacket 12 of a suitable insulating material. The vessel extends slightly above the shell 10 and, like the shell, has rolled edges, the bottom of the vessel being raised slightly at 13 to define the annular trough 14 to insure complete evacuation of liquid from the vessel through the dispensing valve pick-up tube, to be presently described.

In the top of the vessel 11 is an elliptical opening 15 which is adapted to be closed by a cover 16 of like shape which has a peripheral flange 17 shaped to define a channel in which is retained a rubber sealing gasket 18. The filler opening 15 and the cover 16 are made in elliptical shape to make possible the sealing medium afforded by the flange and gasket 18 and yet provide for expedient application and removal of the cover 16 which is accomplished simply by a slight rotation and tilting of the cover, a handle in the form of a disc 19 is secured to a stem 20 affixed to and extending upwardly from the center of the cover 16, and, in order to maintain sealing relationship between the gasket 18 and the undersurface of the vessel top, a light leaf spring 21 bridges the cover 16 under the handle 19 and bears at each end against the upper surface of the vessel top at opposite ends of the cover 16.

Flavoring syrup is poured into the container or vessel 21 until the level thereof reaches the circumferential bead 22 made in the wall of the tank. When the tank is filled to the bead 22, the cover 16 is replaced, following which a hose from a source of $CO_2$ gas is attached to the gas inlet valve 23 to fill the void above the liquid with gas up to a predetermined pressure. A pop-off valve 24 determines the pressure of gas in the tank.

The $CO_2$ gas introduced into the tank 12 in the manner described imposes on the liquid therein a pressure tending to expel the carbonated liquid from the tank through the pick-up tube 25 of the dispensing valve 26, to which further reference will be made presently.

While the liquid is pre-cooled before being placed in the tank 12 and is maintained for long periods at low temperature therein, it may be desirable to provide further cooling by placing in a container 27, attached to the underside of cover 16, a small quantity of solid carbon dioxide. The container 27 is attached by means of its annular flange 28 being brought into engagement with diametrically opposed cleats 29, affixed to the underside of the cover 16, as shown particularly in Figure 2.

The dispensing valve 26 is made up of the body 30 which is composed preferably of plastic material because of its low heat conductivity. The body 30 has a recess in its inner end whose walls are interiorly threaded to receive the head 31 of a valve member 32, the latter having an integral threaded nipple 33 on which is threaded a flanged sleeve 34, retaining a packing washer 35. The nipple 33 has a fluid passage therethrough which is counter-bored to receive the upper end of the valve pick-up tube 25 and the sleeve and washer serve to prevent escape of fluid at the connection between the tube 25 and valve member 32.

The head 31 of valve member 32 has a cavity therein containing a ball 36, biased by a coil spring 37, to hold the ball against its seat 38. To displace the ball from its seat, a stem 39 is passed through an axial bore in the body 30 to engage the ball. A knob 40 is attached to the outer end of the stem 39 and is disposed partially in an annular recess 41 in the end of body 30 and is adapted to be pressed by the finger to unseat the ball 36 against the resistance of the spring 37, thus to allow beverage to flow through the dispensing valve under pressure imposed by the $CO_2$ gas in the tank. The beverage will flow from the valve through a tubular spout 42 into a cup held thereunder.

Cups 43 into which drinks are drawn and served are stored in a magazine 44 which is removably attached to the dispenser by means of brackets 45 affixed to the wall thereof. The magazine 44 has an open lower end provided with an annular inwardly turned flange 46 (Fig. 2) which is engaged by the rolled lips of the cups as they assume the lowest position in the magazine. Thus, the column of cups is held while the lowest cup thereof is withdrawn. A cap 47 covers the open upper end of the tube or magazine 44 and is attached to the tube solely by a link 48 to preclude misplacing of the cap.

The dispenser has an overall cover 49 which is adapted to conceal the gas inlet valve, pop-off valve and the closure 16 with its fastening assembly. The cover 49 is held in place by frictional engagement thereof with the shoulder of the tank 12 above the shell 10. Moreover, a disc 50 of insulating material is applied to the underside of the cover 49 to minimize transfer of heat.

Affixed in diametrically opposed relationship to the sides of the shell 10 are metal straps 51 having apertures 52 to receive the ends of shoulder straps by which the beverage dispenser is carried.

Manifestly, the construction as shown and described is capable of some modification and such modification as may be construed to fall within the scope and meaning of the appended claim is also considered to be within the spirit and intent of the invention.

What is claimed is:

A portable dispenser for precooled beverages, comprising a tank having an annular trough in its bottom and an opening in its top, a closure for said opening, a peripheral seal for said closure, means for drawing said seal into sealing engagement with the underside of the top of said tank, an insulating shell encasing the walls and bottom of said tank and terminating short of the top thereof, a $CO_2$ gas inlet valve in said tank top, a dispensing valve communicating with the interior of said tank, above its midsection, a beverage pick-up tube connected to said dispensing valve within said tank and extending into said annular trough, an annular bead formed in the wall of said tank defining a beverage level indicator above said dispensing valve, valve means for automatically exhausting excess gas from said tank when the pressure in said tank exceeds a predetermined value, and an insulated cover having an annular flange frictionally engaging the upper portion of said tank and effective to conceal said closure, said inlet valve and said valve means.

References Cited in the file of this patent

UNITED STATES PATENTS

| Number | Name | Date |
|---|---|---|
| Re. 22,045 | Toward, Jr. | Mar. 3, 1942 |
| 142,383 | Edwards | Sept. 2, 1873 |
| 305,127 | Anderson | Sept. 16, 1884 |
| 718,759 | Hendrix | Jan. 20, 1903 |
| 903,750 | Morrison | Nov. 10, 1908 |
| 1,075,099 | Gruettner | Oct. 7, 1913 |
| 1,778,248 | Doughty | Oct. 14, 1930 |
| 1,915,123 | Downs | June 20, 1933 |
| 2,151,586 | Cameron | Mar. 21, 1939 |
| 2,181,073 | Schafer et al. | Nov. 21, 1939 |
| 2,188,735 | Grundstrom | Jan. 30, 1940 |
| 2,195,554 | Beardsley | Apr. 2, 1940 |
| 2,197,143 | Cannon et al. | Apr. 16, 1940 |
| 2,281,142 | Davis | Apr. 28, 1940 |
| 2,531,717 | Zimmer | Nov. 28, 1950 |
| 2,539,929 | Roberts | Jan. 30, 1951 |
| 2,550,840 | Martin et al. | May 1, 1951 |
| 2,581,995 | Zimmer | Jan. 8, 1952 |